(12) United States Patent
Wang et al.

(10) Patent No.: US 12,521,059 B2
(45) Date of Patent: Jan. 13, 2026

(54) CONTROL SYSTEM AND SMART BED THEREWITH

(71) Applicant: Nisco Co., Ltd, Jiangsu (CN)

(72) Inventors: Wei Wang, Jiangsu (CN); Jian Xie, Jiangsu (CN)

(73) Assignee: NISCO CO., LTD, Jiangsu (CN)

( * ) Notice: Subject to any disclaimer, the term of this patent is extended or adjusted under 35 U.S.C. 154(b) by 838 days.

(21) Appl. No.: 17/700,704

(22) Filed: Mar. 22, 2022

(65) Prior Publication Data

US 2022/0312985 A1    Oct. 6, 2022

Related U.S. Application Data

(60) Provisional application No. 63/174,121, filed on Apr. 13, 2021.

(30) Foreign Application Priority Data

Apr. 2, 2021  (CN) .......................... 202110363028.1

(51) Int. Cl.
*A61B 5/00* (2006.01)
*A47C 20/04* (2006.01)
*G06F 3/01* (2006.01)
*H04W 4/38* (2018.01)

(52) U.S. Cl.
CPC .......... *A61B 5/4818* (2013.01); *A47C 20/041* (2013.01); *G06F 3/011* (2013.01); *H04W 4/38* (2018.02)

(58) Field of Classification Search
CPC .... A61B 5/4818; A61B 5/4806; A47C 20/041
See application file for complete search history.

(56) References Cited

U.S. PATENT DOCUMENTS

| | | | | |
|---|---|---|---|---|
| 2016/0120740 | A1* | 5/2016 | Rawls-Meehan | A47C 31/008 601/49 |
| 2019/0209405 | A1* | 7/2019 | Sayadi | A61G 7/018 |
| 2021/0030313 | A1* | 2/2021 | Hsiao | A61B 5/1126 |
| 2021/0368998 | A1* | 12/2021 | Saghiri | A47C 21/003 |

* cited by examiner

*Primary Examiner* — Howard Cortes
(74) *Attorney, Agent, or Firm* — troutman pepper locke; Tim Tingkang Xia, Esq.

(57) ABSTRACT

A control system and a bed with the control system. The control system includes a signal acquisition and processing module; a control box coupled to the signal acquisition and processing module; and a controller coupled to the control box. The signal acquisition and processing module is configured to acquire user sleep data from a user of the bed, process the acquired user sleep data, and transmit the processed user sleep data to the control box. The control box is configured to receive the processed user sleep data from the signal acquisition and processing module, generate operation instructions based on the received user sleep data, and send the operation instructions to the controller. The controller is configured to perform corresponding operations based on the operation instructions received from the control box.

20 Claims, 9 Drawing Sheets

CONTROL SYSTEM AND SMART BED THEREWITH

CROSS-REFERENCE TO RELATED PATENT APPLICATIONS

This application claims priority to and the benefit of U.S. Provisional Patent Application No. 63/174,121, filed Apr. 13, 2021, which is incorporated herein in its entirety by reference.

This application also claims priority to and the benefit of Chinese Patent Application No. 202110363028.1, filed Apr. 2, 2021, which is incorporated herein in its entirety by reference.

FIELD OF THE INVENTION

The invention generally relates to a bed, and more particular to a control system and a smart bed with the control system.

BACKGROUND OF THE INVENTION

Sleep is critical for people in every aspect of their lives. Beds are necessary furniture for people to sleep on. An electric bed generally has smart/intelligent functions such as a posture adjustment function and a user sleep data collection function. A user can adjust the bed to raise the back or legs to a certain angle according to their needs, especially when the user is reading a book, watching TV or resting while sick, lying half-sitting on the bed. The posture is more comfortable, therefore, electric beds are widely used in hospitals and homes.

In addition, by utilizing certain sensors installed in an electric bed, the user sleep data can be collected for analysis of the sleep status of the user. Usually, the analysis of the sleep status of the user is performed through big data of a cloud server, which requires the collected user sleep data by the sensors be uploaded to the cloud server, and the cloud server performs corresponding data processing, and then sends it to a user terminal, which may require the subscription of the cloud server, thereby increasing the cost on one hand, and have the risk in a leakage of user privacy on the other hand.

Therefore, a heretofore unaddressed need exists in the art to address the aforementioned deficiencies and inadequacies.

SUMMARY OF THE INVENTION

In one aspect, the invention relates to a control system of a bed having at least one platform. The control system includes a signal acquisition and processing module; a control box coupled to the signal acquisition and processing module; and a controller coupled to the control box. The signal acquisition and processing module is configured to acquire user sleep data from a user of the bed, process the acquired user sleep data, and transmit the processed user sleep data to the control box. The controller is configured to perform corresponding operations based on instructions from the control box.

The control box comprises a control panel with an operating system, coupled with the signal acquisition and processing module and the controller and configured to obtain user sleep data from the signal acquisition and processing module; a sleep data analysis module, configured to run in the control panel with the operating system and generate sleep analysis data based on the user sleep data obtained from the signal acquisition and processing module and a pre-trained sleep analysis model; and a wireless communication module, configured to run in the control panel with the operating system and transmit the generated sleep analysis data to a user terminal through a wireless network, so that the user terminal can view all the sleep analysis data.

In one embodiment, the signal acquisition and processing module comprises at least one data acquisition member, configured to acquire user sleep signals; and at least one signal processing module, coupled with the at least one data acquisition member and configured to process the acquired user sleep signals to generate the user sleep data. The at least one signal processing module comprises an amplifier configured to amplify the acquired user sleep signals; an analog-to-digital conversion (ADC) circuit configured to perform analog-to-digital conversion of the acquired user sleep signals; and a microprocessor configured to generate the user sleep data based on the converted user sleep signals.

In one embodiment, the data acquisition member comprises at least one sensor and/or at least one microphone, wherein the at least one sensor comprises at least one piezoelectric sensor, at least one pressure sensor, at least one temperature sensor, at least one gyroscope sensor, and/or at least one inertial measurement unit (IMU).

In one embodiment, the at least one sensor is operably installed on an upper surface of the at least one platform.

In one embodiment, the microprocessor is configured to process the user sleep signals received from the data acquisition member based on a preset algorithm to form the user sleep data.

In one embodiment, the control panel with the operating system comprises a system on a chip (SoC) having a microprocessor coupled with the sleep data analysis module and the wireless communication module.

In one embodiment, the sleep data analysis module comprises a data accumulation unit, configured to accumulate the user sleep data of a preset duration and/or a preset amount of data; and a sleep analysis model unit, configured to generate the sleep analysis data by using the user sleep data of the preset duration and/or the preset data amount as an input of the sleep analysis model.

In one embodiment, the sleep data analysis module further comprises a control unit, such as a microcontroller unit (MCU), configured to detect snoring data from the user sleep data, generate an anti-snoring instruction when the snoring data meets a preset condition, and send the anti-snoring instruction to the controller, wherein the controller responsively adjusts an angle of the at least one platform of the bed based on the anti-snoring instruction, so as to suppress snoring of the user.

In one embodiment, the control box further comprises an external storage module, being pluggably installable on the control panel and in communication with the sleep data analysis module, and configured to receive the sleep analysis data from the sleep data analysis module and store the sleep analysis data therein.

In one embodiment, the user sleep data comprises one or more of user respiration data, user heart rate data, user motion data, and snoring data; wherein the sleep analysis data comprises one or more of deep sleep analysis data, light sleep analysis data, rapid eye movement sleep analysis data, and sleep-wake state analysis data.

In another aspect, the invention relates to a bed comprising a frame structure; at least one platform moveably attached to the frame structure; and a control system comprising a signal acquisition and processing module; a control box coupled to the signal acquisition and processing module; and a controller coupled to the control box.

The signal acquisition and processing module is configured to acquire user sleep data from a user, process the acquired user sleep data, and transmit the processed user sleep data to the control box;

The controller is configured to perform corresponding operations based on instructions from the control box; and The control box comprises a control panel with an operating system, coupled with the signal acquisition and processing module and the controller and configured to obtain user sleep data from the signal acquisition and processing module; a sleep data analysis module, configured to run in the control panel with the operating system and generate sleep analysis data based on the user sleep data obtained from the signal acquisition and processing module and a pre-trained sleep analysis model; and a wireless communication module, configured to run in the control panel with the operating system and send the generated sleep analysis data to a user terminal through a wireless network, so that the user terminal can view all the sleep analysis data.

In one embodiment, the signal acquisition and processing module comprises at least one data acquisition member, configured to acquire user sleep signals; and at least one signal processing module, coupled with the at least one data acquisition member and configured to process the acquired user sleep signals to generate the user sleep data, wherein the at least one signal processing module comprises an amplifier configured to amplify the acquired user sleep signals; an ADC circuit configured to perform analog-to-digital conversion of the acquired user sleep signals; and a microprocessor configured to generate the user sleep data based on the converted user sleep signals.

In one embodiment, the data acquisition member comprises at least one sensor and/or at least one microphone, wherein the at least one sensor comprises at least one piezoelectric sensor, at least one pressure sensor, at least one temperature sensor, at least one gyroscope sensor, and/or at least one IMU.

In one embodiment, in the at least one platform has at least one groove formed on its upper surface, and the at least one sensor is operably installed on an upper surface of the at least one platform, such that when installed, the surface of the at least one sensor is in a co-plane with the upper surface of the at least one platform.

In one embodiment, the control panel with the operating system comprises an SoC having a microprocessor coupled with the sleep data analysis module and the wireless communication module.

In one embodiment, the sleep data analysis module comprises a data accumulation unit, configured to accumulate the user sleep data of a preset duration and/or a preset amount of data; and a sleep analysis model unit, configured to generate the sleep analysis data by using the user sleep data of the preset duration and/or the preset data amount as an input of the sleep analysis model.

In one embodiment, the sleep data analysis module further comprises a control unit, such as an MCU, configured to detect snoring data from the user sleep data, generate an anti-snoring instruction when the snoring data meets a preset condition, and send the anti-snoring instruction to the controller, wherein the controller responsively adjusts an angle of the at least one platform of the bed based on the anti-snoring instruction, so as to suppress snoring of the user.

In one embodiment, the bed further comprises a back lifting assembly and a leg lifting assembly moveably connected to the frame structure and electrically coupled with the controller, wherein a back portion and a leg portion of the user are operably in relation to the back lifting assembly and the leg lifting assembly, respectively, and positions of the back portion and the leg portion of the user are individually and/or coordinately adjustable in accordance with operations of the back lifting assembly and the leg lifting assembly.

In one embodiment, the back lifting assembly comprises a back lifting bracket pivotally connected to the frame structure, and a back lifting actuator pivotally connected between the back lifting bracket and the frame structure for operably driving the back lifting bracket to pivotally move in an upward rotating direction or a downward rotating direction relative to the frame structure, thereby causing a back portion of the at least one platform and therefore the back portion of the user to be lifted up or lifted down.

In one embodiment, the leg lifting assembly comprises a leg lifting bracket pivotally coupled to the frame structure, and a leg lifting actuator pivotally connected between the leg lifting bracket and the frame structure for operably driving the leg lifting bracket to pivotally move in an upward rotating direction or a downward rotating direction relative to the frame structure, thereby causing a leg portion of the at least one platform and therefore the leg portion of the user to be lifted up or lifted down.

In one embodiment, the bed further comprises at least one massager installed in the at least one platform and electrically coupled with the controller for providing massage effect to corresponding portions of the user.

According to the invention, the control system and the bed with the control system have the following beneficial effects.

Through the control panel with the operating system, the analysis of the user sleep data can be carried out within the bed locally, and the communication between the bed and the user terminal can be directly realized, which avoids the uploading of the monitored user sleep data to the cloud server and reduces the risk of data leakage of the user. In addition, various user sleep data such as user breathing, user heart rate, user movement, snoring, etc., are collected, and monitored based on the preset sleep analysis model, which can achieve multi-dimensional and high-precision sleep data analysis. Moreover, the position and angle of the back platform of the bed can be adjusted, when snoring is detected, so as to control the user's snoring. Furthermore, the sensors are installed on the upper surface of the bed platforms and in operation, directly contacts the user body, which makes the collected user sleep data is more accurate.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Furthermore, relative terms, such as "lower" or "bottom" and "upper" or "top" may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper" depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising" or "includes" and/or "including" or "has" and/or "having", or "carry" and/or "carrying," or "contain" and/or "containing" or "involve" and/or "involving", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on", "attached" to, "connected" to, "coupled" with, "contacting", etc., another element, it can be directly on, attached to, electrically coupled to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

As used in this disclosure, the term "platform(s)" refers to bed platform(s) or board(s).

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The systems and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Embodiments of the invention are illustrated in detail hereinafter with reference to accompanying drawings in FIGS. 1-9. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in one aspect, relates to a control system and a smart bed with the control system.

Referring to FIGS. 1-7, the control system of a smart bed having at least one platform is shown according to various embodiments of the invention. The control system includes a signal acquisition and processing module 20, a control box 10 coupled to the signal acquisition and processing module 20, and a controller 30 coupled to the control box 10. The signal acquisition and processing module 20 is configured to acquire user sleep data from a user of the bed, process the acquired user sleep data, and transmit the processed user sleep data to the control box 10. The control box 10 is configured to obtain the processed user sleep data from the signal acquisition and processing module 20, generate operation instructions based on the obtained user sleep data, and send the operation instructions to the controller 30. The controller 30 is configured to perform corresponding operations based on the operation instructions received from the control box 10.

The user sleep data includes, but is not limited to, one or more of user respiration data, user heart rate data, user motion data, and snoring data. The sleep analysis data includes, but is not limited to, one or more of deep sleep analysis data, light sleep analysis data, rapid eye movement sleep analysis data, and sleep-wake state analysis data.

Figure 5:
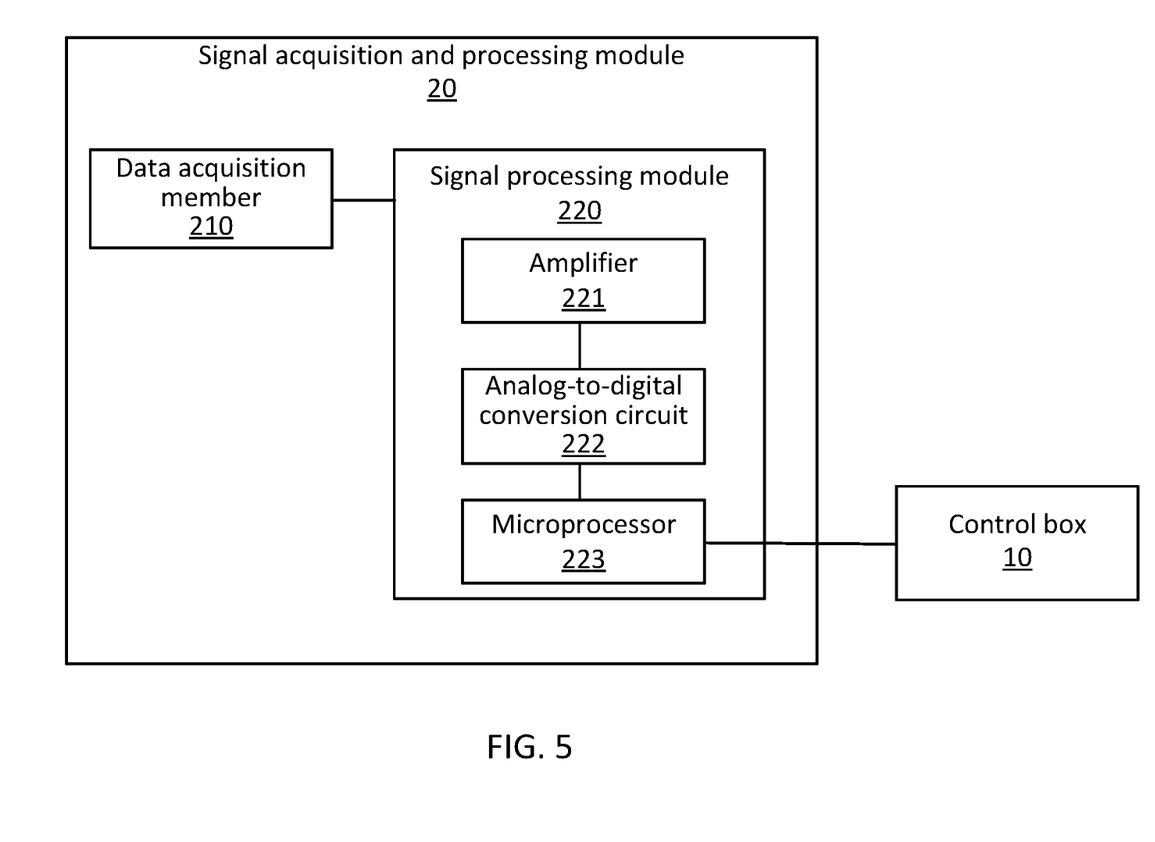
FIG. 5 is schematically a block diagram of a signal acquisition and processing module of a smart bed according to one embodiment of the present invention.
Figure 6:
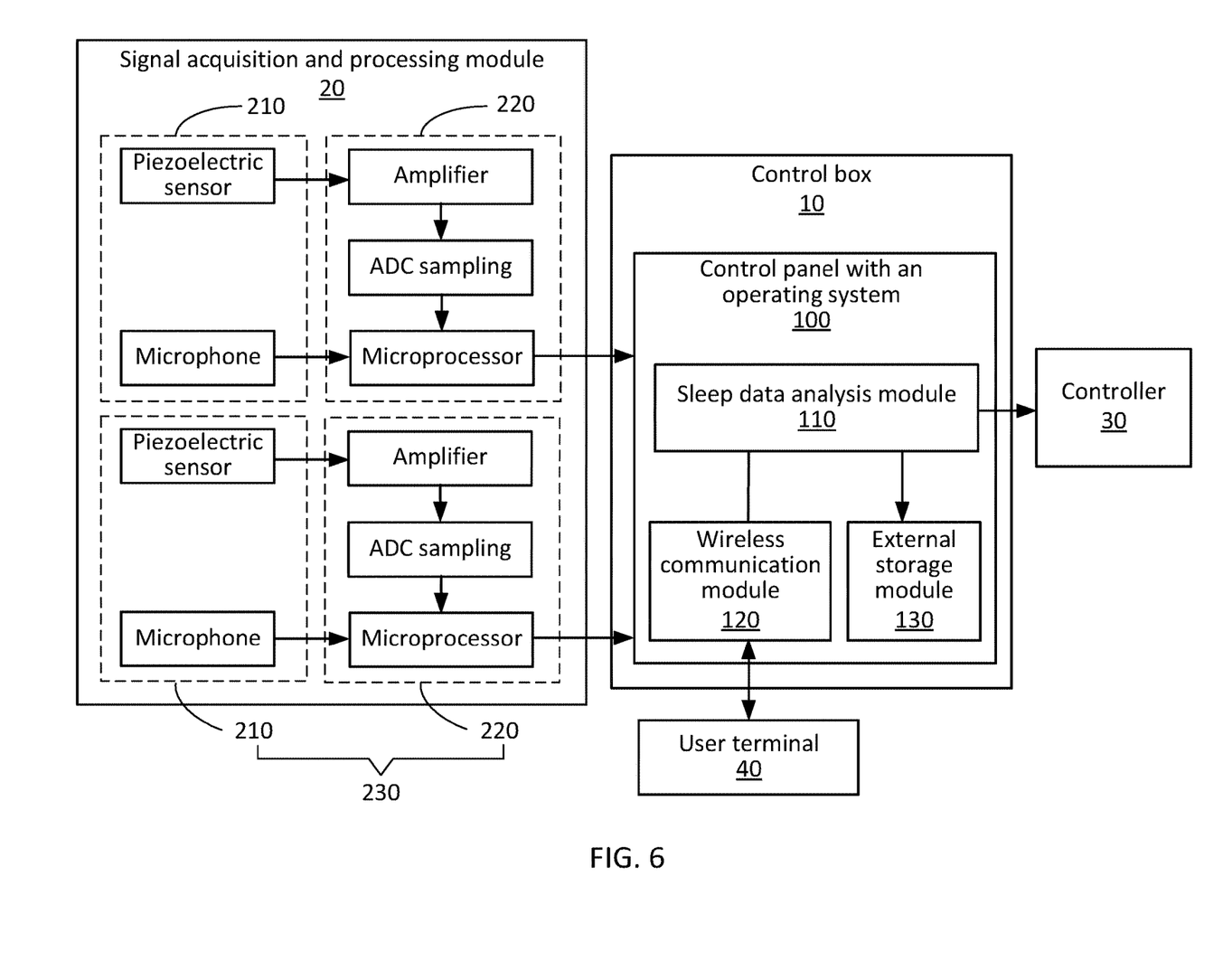
FIG. 6 is schematically a block diagram of a control system of a smart bed according to one embodiment of the present invention.

In certain embodiments shown in FIGS. 5-6, the signal acquisition and processing module 20 comprises at least one data acquisition member 210, configured to acquire user sleep signals; and at least one signal processing module 220, coupled with the at least one data acquisition member 210 and configured to process the acquired user sleep signals to generate the user sleep data.

Figure 8:
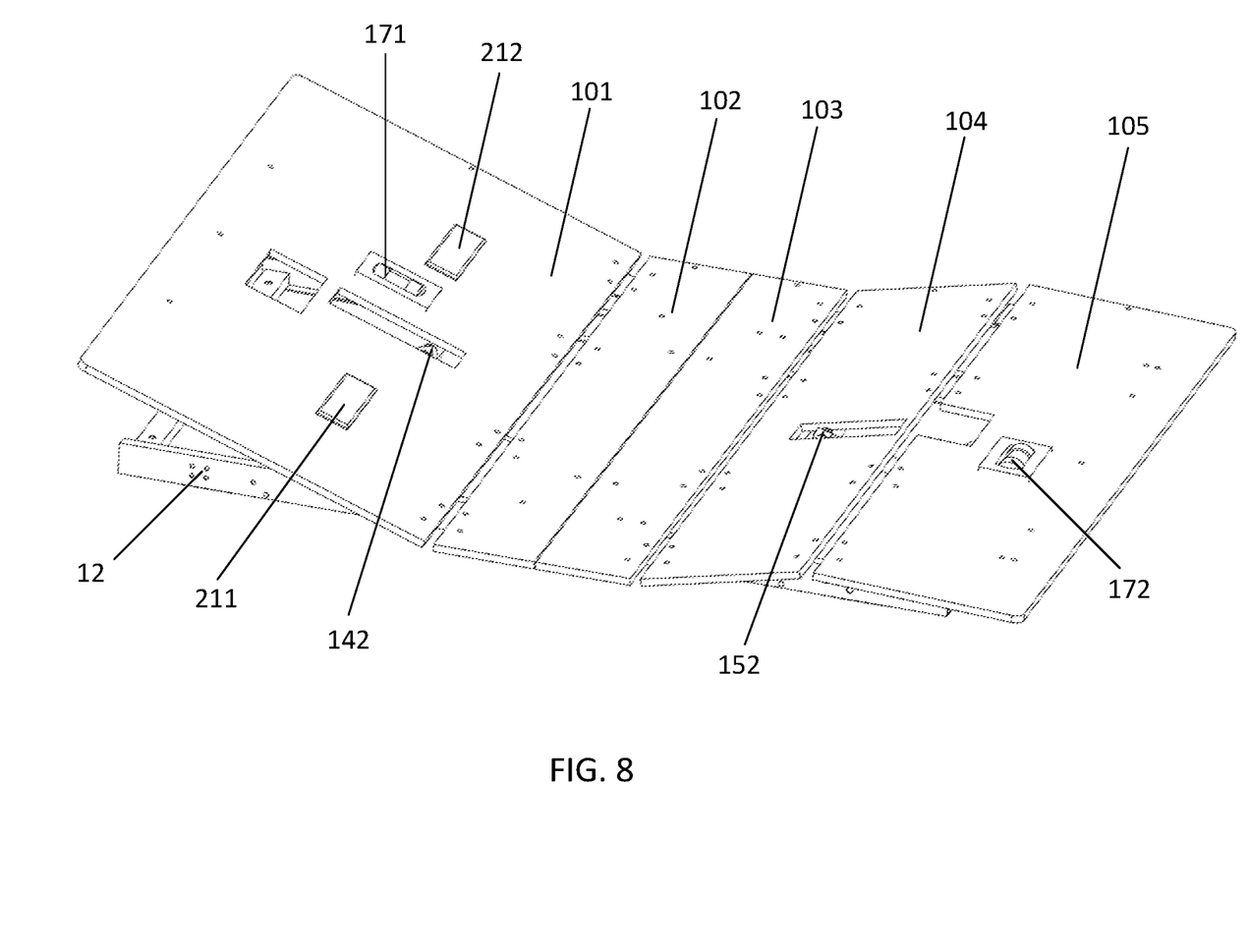
FIG. 8 is schematically a front perspective view of a smart bed according to one embodiment of the present invention.

In one embodiment shown in FIG. 6, the data acquisition member 210 comprises at least one sensor and/or at least one microphone. The at least one sensor comprises at least one piezoelectric sensor, at least one pressure sensor, at least one temperature sensor, at least one gyroscope sensor, and/or at least one inertial measurement unit (IMU). In some embodiments, as shown in FIG. 8, two sensors 211 and 212 are operably installed on an upper surface of the back platform 101. As such, when installed, the surface of the two sensors 211 and 212 are in a co-plane with the upper surface of the back platform 101. Accordingly, during sleep, the sensors directly contact the user body, so as to make the collected user sleep data more accurate. The at least one sensor mat be adapted for detecting user respiration data, user heart rate data, user motion data, and/or user orientation data. The microphone can be disposed around the user for acquiring, for example, the user snoring data, by acquiring audio signals from the user during sleep.

Further referring to FIG. 6, the data acquisition member 210 in one embodiment includes one piezoelectric sensor and one microphone, which respectively collect weak vibration signals and audio signals of the user. Preferably, the signal acquisition and processing module 20 includes two data acquisition members 210 and two signal processing modules 220. Of them, a data acquisition member 210 and a signal processing module 220 may be integrated together to form a sleep monitoring module 230. This embodiment of the data acquisition member 210 preferably includes two sleep monitoring modules 230.

In one embodiment shown in FIGS. 5-6, the at least one signal processing module 220 comprises an amplifier 221 configured to amplify the acquired user sleep signals; an analog-to-digital conversion (ADC) circuit 222 configured to perform analog-to-digital conversion of the acquired user sleep signals; and a microprocessor 223 configured to generate the user sleep data based on the converted user sleep signals.

In one embodiment as shown in FIG. 6, the microprocessor 223 is configured to process the user sleep signals received from the data acquisition member 210 based on a preset algorithm to form the user sleep data.

In one embodiment, the microprocessor 223 filters the data (user sleep signals) collected from the data acquisition member 210 into multiple signals through a built-in software filter, including one ultra-low-pass signal of the respiratory wave and one low-pass signal of the heart rate wave. In one embodiment, the microprocessor 223 calculates respectively the heart rate wave as the heart rate data and the respiration wave as the respiration rate data through a preset algorithm. In one embodiment, the microprocessor 223 determines the overload and large amplitude user sleep signal of the user sleep signals received from the data acquisition member 210 as user body motion data.

In one embodiment, the microprocessor 223 acquires the audio volume data collected by the microphone, and calculates and forms snoring data based on the audio volume data and the respiratory wave data. In one embodiment, the snoring data may be acquired based on the volume, waveform, and breathing waveform of the audio volume compared with the volume, waveform, and breathing waveform during snoring.

Figure 1:
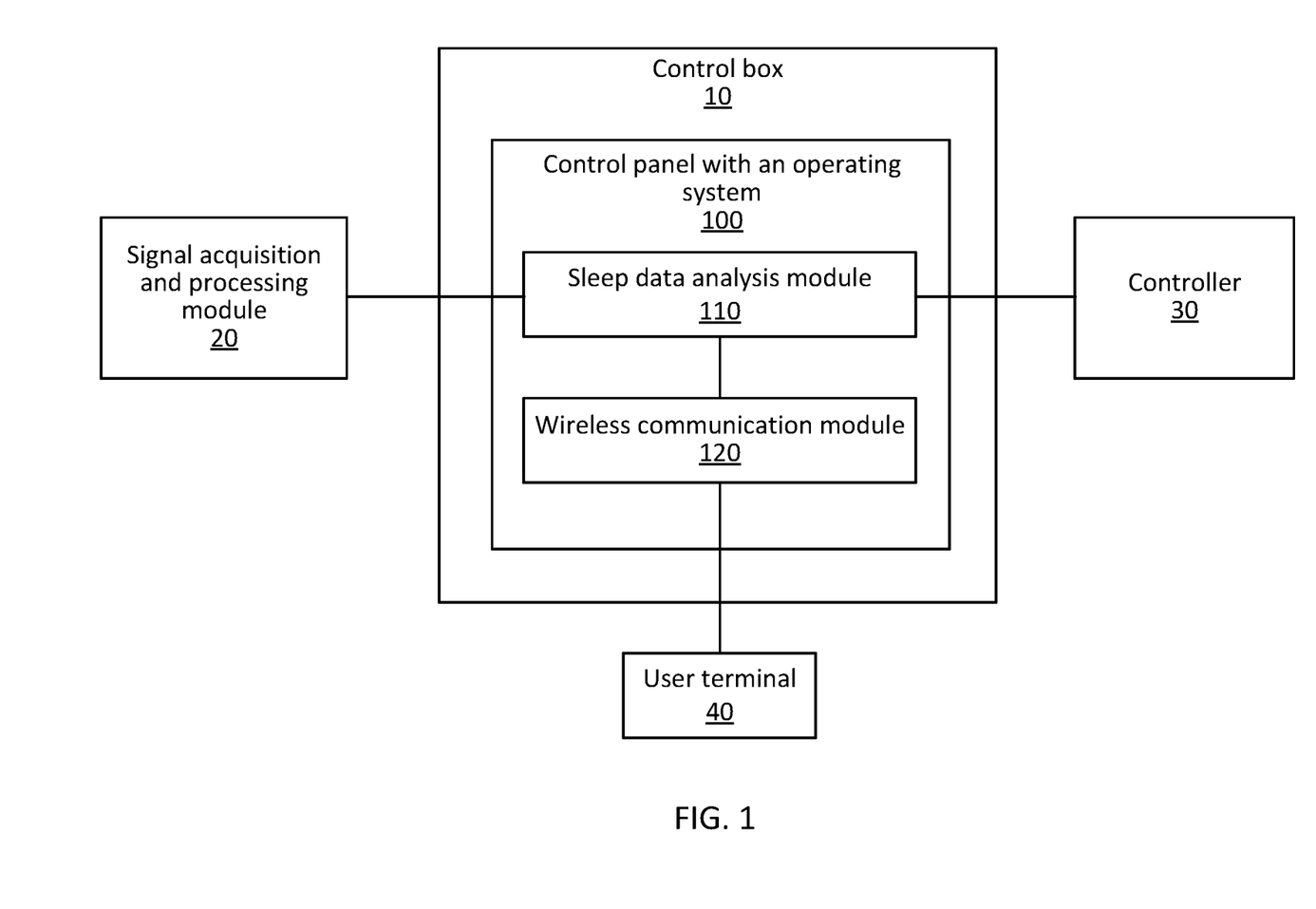
FIG. 1 is schematically a block diagram of a control system of a smart bed according to one embodiment of the present invention.
Figure 2:
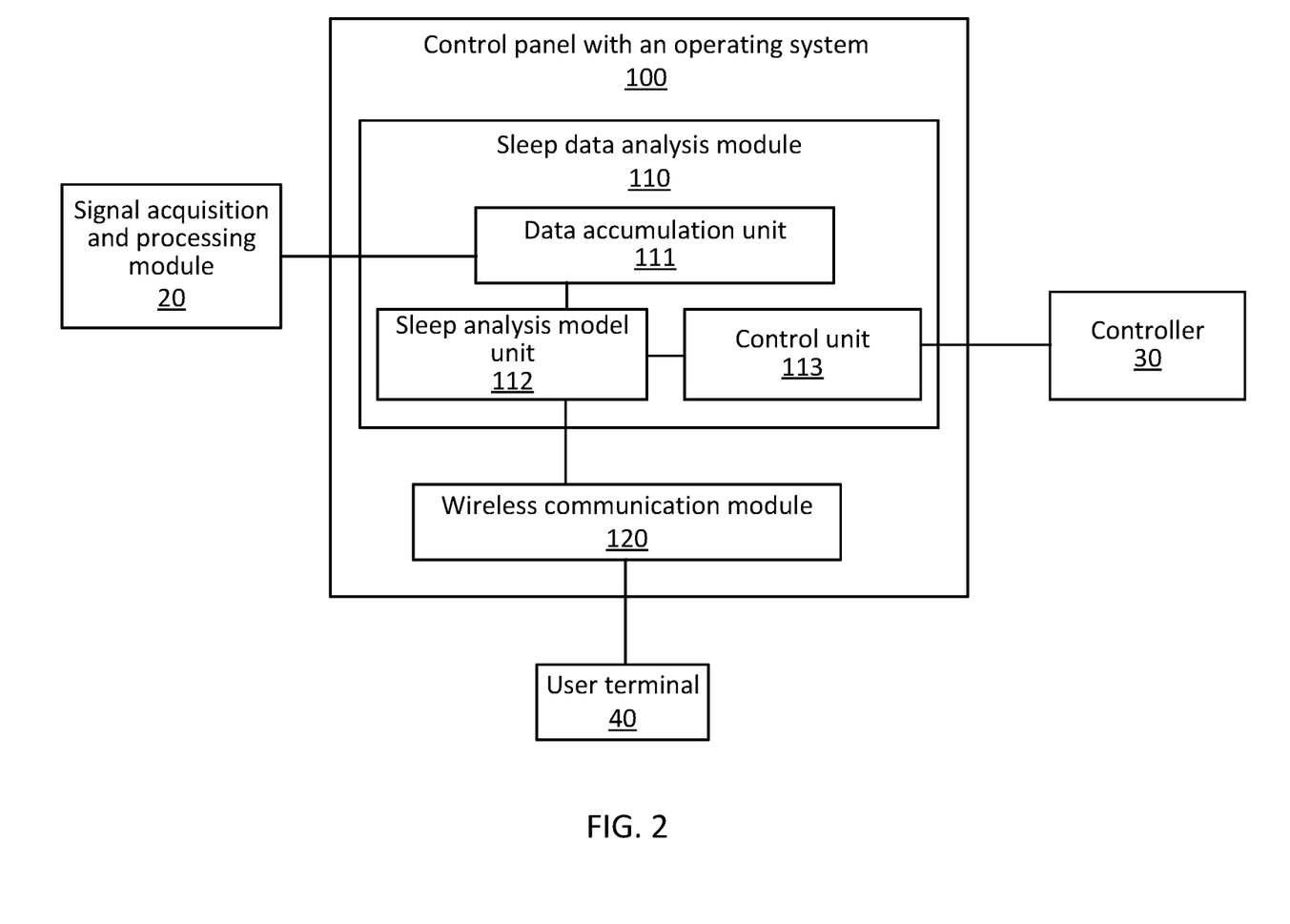
FIG. 2 is schematically a block diagram of a control system of a smart bed according to another embodiment of the present invention.
Figure 3:
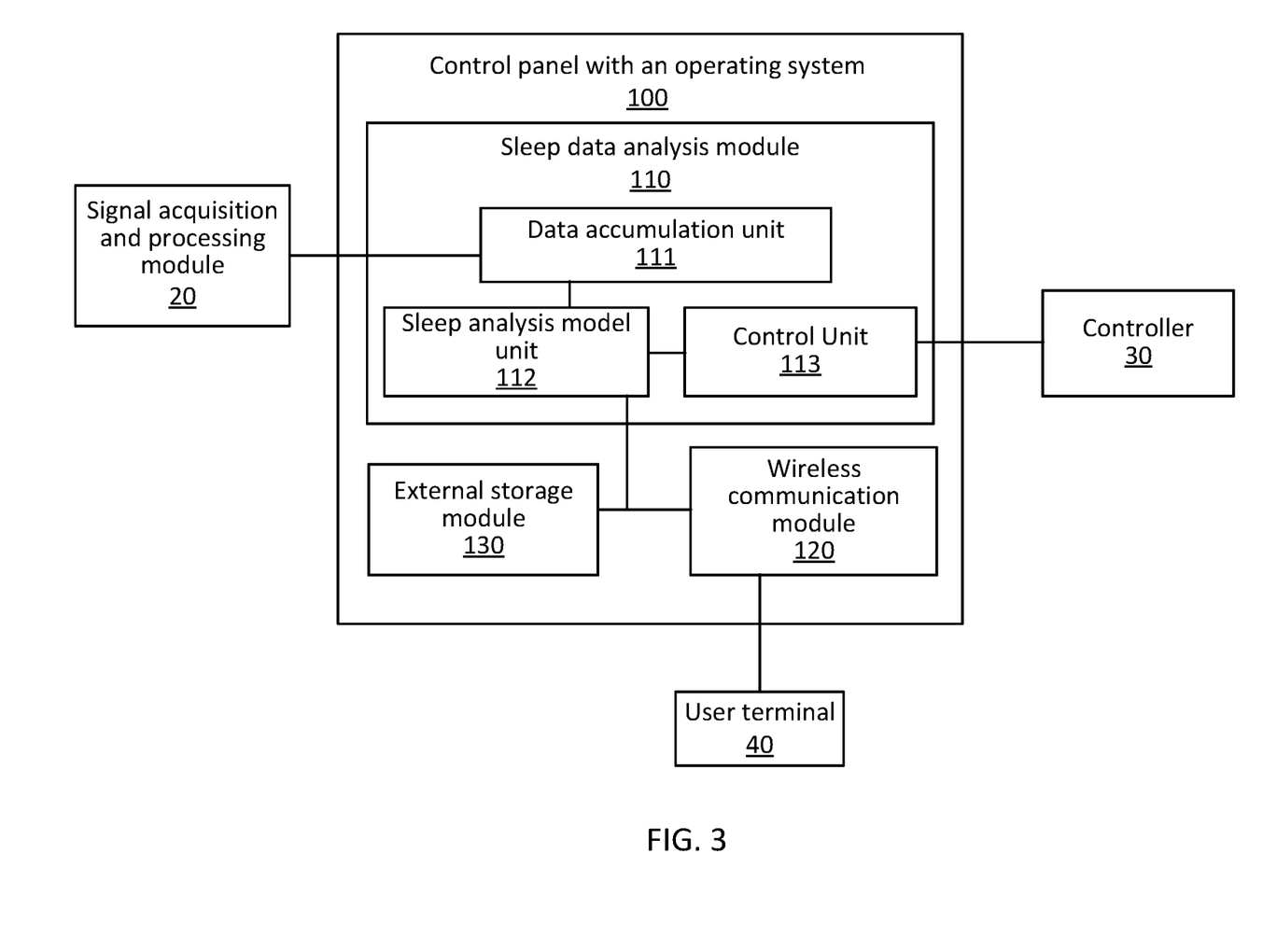
FIG. 3 is schematically a block diagram of a control system of a smart bed according to one embodiment of the present invention.
Figure 4:
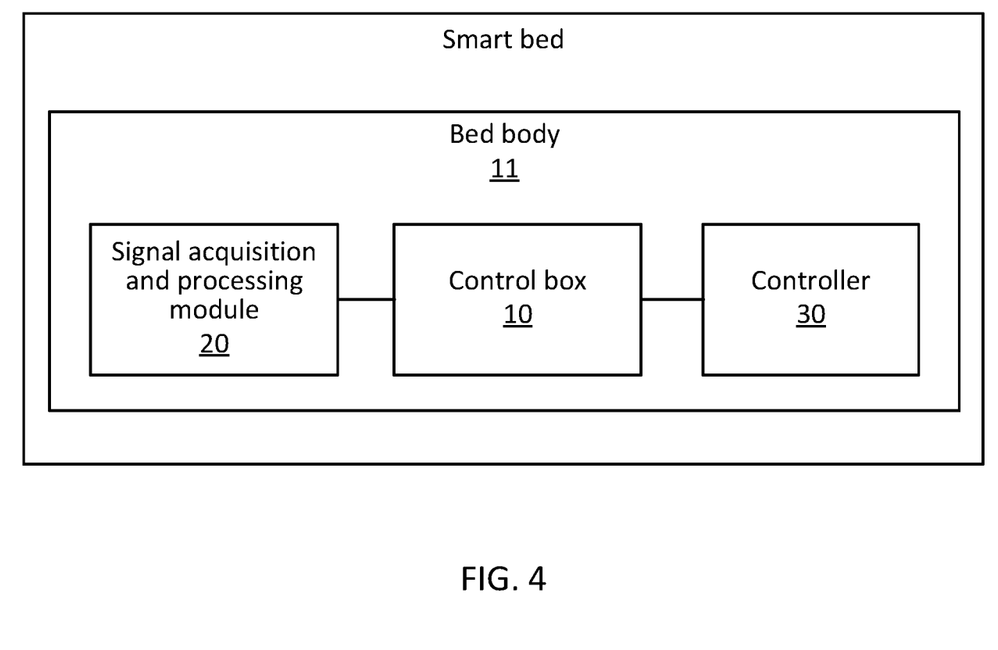
FIG. 4 is schematically a block diagram of a smart bed according to one embodiment of the present invention.

As shown in FIGS. 1-3, the control box 10 is shown according to different embodiments of the invention.

The control box 10 in one embodiment comprises a control panel 100 with an operating system coupled with the signal acquisition and processing module 20 and the controller 30 and configured to obtain user sleep data from the signal acquisition and processing module 20, generate operation instructions based on the obtained user sleep data, and send the operation instructions to the controller 30. In one embodiment, the operating system is, but is not limited to, a Linux operating system. One benefit of the control panel 100 with the operating system is that the obtained user sleep data can be processed locally through the control panel 100 with the Linux operating system, instead of uploading the user sleep data to an cloud service in which the user sleep data is processed, which could avoid the risk of data leakage for the user.

In some embodiments, the control panel 100 with the operating system comprises a system on a chip (SoC) having a microprocessor coupled with the sleep data analysis module 110 and the wireless communication module 120. For example, the control panel 100 may include a printed circuit board (PCB) with an application specific integrated circuit (ASIC), a field programmable gate array (FPGA); and/or a processor, along with memory and programmable input/output (I/O) peripherals.

The control box 10 also has a sleep data analysis module 110 configured to run in the control panel 100 with the operating system and generate sleep analysis data based on the user sleep data obtained from the signal acquisition and processing module 20 and a pre-trained sleep analysis model. In some embodiments, the sleep data analysis module 110 may be disposed/assembled in the PCB and electrically connected the input/output (I/O) peripherals of the control panel 100.

In some embodiments shown in FIGS. 2-3, the sleep data analysis module 110 comprises a data accumulation unit 111 configured to accumulate the user sleep data of a preset duration and/or a preset amount of data, a sleep analysis model unit 112 configured to generate the sleep analysis data by using the user sleep data of the preset duration and/or the preset data amount as an input of the sleep analysis model, and a control unit 113, such as a microcontroller unit (MCU), which is configured to detect snoring data from the user sleep data, generate an anti-snoring instruction when the snoring data meets a preset condition, and send the anti-snoring instruction to the controller 30. In operation, the controller 30 responsively adjusts an angle of the at least one platform, e.g., the back platform of the bed, based on the anti-snoring instruction, so as to suppress or reduce snoring of the user.

In some embodiments, after obtaining the user sleep data from the signal acquisition and processing module 20 through a data interface, the control panel 100 with the Linux operating system temporarily stores the collected/obtained user sleep data in an internal storage unit of the Linux operating system. When the temporary data (i.e., the temporary user sleep data) is accumulated and reaches the preset data amount, the accumulated user sleep data is input to the sleep analysis model unit 112. The preset data amount is, for example, but not limited to, defined based on the amount of sleep at one time.

Alternatively, when the accumulated time of the stored temporary data (i.e., the temporary user sleep data) reaches a preset time duration, the accumulated user sleep data is input to the sleep analysis model unit 112. Among them, the preset time duration is, for example, one day, one night, or 2 hours.

In some embodiments, the sleep analysis model unit 112 uses the accumulated user sleep data in the preset duration and/or the preset data amount as the input of the sleep analysis model to generate the sleep analysis data.

In some embodiments, the sleep analysis model is a pre-trained sleep analysis model based on a sleep staging algorithm. That is, in some embodiments, the sleep analysis model is pre-trained and can perform data analysis on the accumulated user sleep data to generate corresponding sleep analysis data. The sleep analysis model and the applied sleep staging algorithm are not limited to these disclosed herein. It should be appreciated that any sleep analysis model that can generate corresponding sleep analysis data based on the input of the user sleep data can be used as a preset sleep analysis model within the control panel 100 with the Linux operating system.

The control box 10 further has a wireless communication module 120 configured to run in the control panel 100 with the operating system and send the generated sleep analysis data to a user terminal 40 through a wireless network, so that the user terminal 40 can view all the sleep analysis data. In some embodiments, the wireless communication module 120 may be disposed/assembled in the PCB and electrically connected the input/output (I/O) peripherals of the control panel 100. In some embodiments, the sleep data analysis module 110 can preset the display mode, type, etc. of the sleep analysis data. The user can also configure the display mode, type, etc. of the sleep analysis data through the user terminal 40.

In some embodiments, the wireless communication module 120 includes, but is not limited to, a Bluetooth® communication module/protocol, a WiFi® communication module/protocol, a wireless network communication module/protocol, a near-field communication (NFC) communication module/protocol, and the like. In one embodiment, the wireless communication module 120 is preferably a Bluetooth communication module. That is, in operation, the control box 10 sends the sleep analysis data to the user terminal 40 via the Bluetooth® communication protocol, so that the user terminal 40 can view the sleep analysis data thereon. In other words, the user can directly acquire the sleep analysis data from the control box 10 through the user terminal 40 using Bluetooth® communication.

The user terminal 40 in some embodiments can be a smart mobile device, such as a smartphone, a tablet, a laptop, a computer, a remote control, or the like. Further, the control system may include an APP installed in the user terminal 40 with at least one graphic user interface (GUI) from which a user can configure and/or change certain configurations and/or operation parameters of the he control box 10, based on the user's preference and experience, for example, changing the preset duration and/or the preset data amount for which the user sleep data are accumulated, and/or the preset condition for determining if a user is snoring during sleep, if needed.

In one embodiment shown in FIG. 3, the control box 100 may also have an external storage module 130, which is pluggably installable on the control panel 100 and in communication with the sleep data analysis module 110, and configured to receive the sleep analysis data from the sleep data analysis module 110 and store the sleep analysis data therein. In some embodiments, the data analysis module 110 is connected to receive and store the sleep analysis data from the sleep data analysis module 110.

In some embodiments, the external memory module 130 is an external memory, which refers to the memory other than the operating system memory and the CPU cache in the control panel 100. Generally, the external memory can still save data after the power is turned off. In some embodiments, the external storage module 130 is, but not limited to, a hard disk, a floppy disk, an optical disk, a U disk, a flash drive, and the like.

In some embodiments, the sleep analysis data can be obtained through the external storage module 130 pluggable on the control panel 100 with the operating system. The user can plug the external storage module 130 on other card reading devices to read the obtained sleep analysis data therein.

Accordingly, the control box 10 can be used to monitor the user's sleep data so as to determine if the user is snoring, and adjust the position and angle of the back platform 101 of the bed through the controller 30 when the user snoring is determined, thereby to control or suppress the snoring of the user.

In addition, the user sleep data can also be used to analyze the sleep status of the user for providing health prediction, management and services, and preventing sudden situations such as myocardial infarction, cerebral infarction, and sudden death.

Referring to FIGS. 4 and 7-9, a smart bed is shown according to embodiments of the invention. In some embodiments, the smart bed is an adjustable bed.

The smart bed includes a bed body 11 having a frame structure 12, at least one platform moveably attached to the frame structure 12, and a control system installed on the frame structure 12 and/or the at least one platform for controlling operations of the smart bed. The control system is disclosed above. The details of the control system is referred to the above descriptions and will not be repeated therein.

Figure 9:
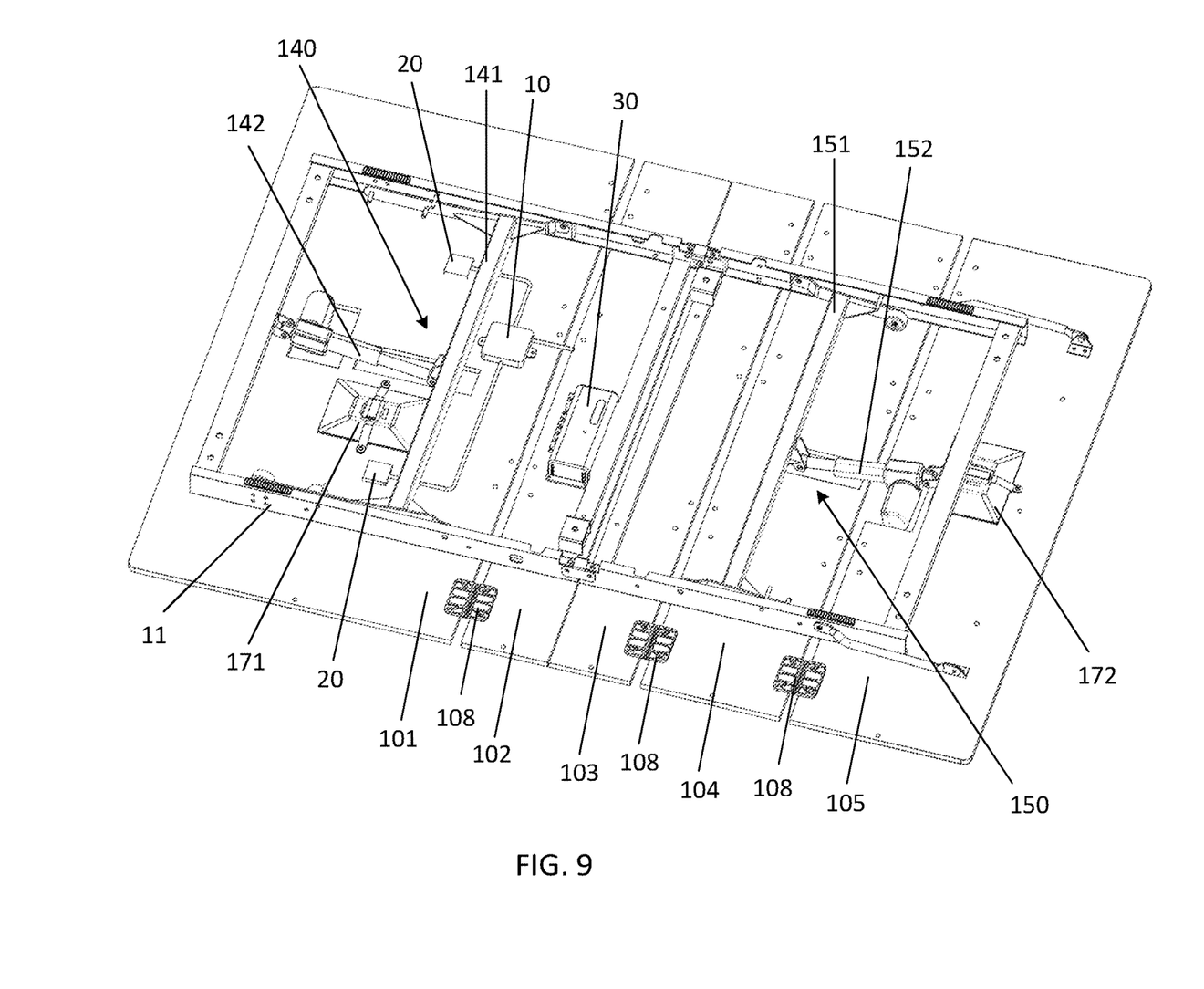
FIG. 9 is schematically a rear perspective view of the smart bed shown in FIG. 8.

As shown in FIGS. 8-9, the frame structure 12 in one embodiment is composed of horizontal rails/rods and vertical rails/rods. The at least one platform includes, but is not limited to, a back platform 101, two waist platforms 102 and 103, a thigh platform 104 and a leg platform 105. Each two adjacent platforms are hinged by a hinge 108. Positions and angles of the back platform 101, the thigh platform 104 and the leg platform 105 are adjustable, while the two waist platforms 102 and 103 is fixed on the frame structure 12.

The bed also includes a back lifting assembly 140 and a leg lifting assembly 150 moveably connected to the frame structure 12 and electrically coupled with the controller 30. The back lifting assembly 140 is configured to adjust the position and angle of the back platform 101, while the leg lifting assembly 150 is configured to adjust the positions and angles of the thigh platform 104 and the leg platform 105. Both the back lifting assembly 140 and the leg lifting assembly 150 can be operated individually or cooperatively, through the controller 30.

For the bed, when lying on the bed, a back portion and a leg portion of the user are corresponding to the back platform 101, and the thigh and leg platforms 104 and 105, respectively, and thus are in relation to the back lifting assembly 140 and the leg lifting assembly 140, respectively. Accordingly, the positions of the back portion and the leg portion of the user are individually and/or coordinately adjustable in accordance with operations of the back lifting assembly 140 and the leg lifting assembly 150. The back portion of the user may refer to the part or the whole of the upper body of the user, while the leg portion of the user may refer to the part or the whole of the lower body of the user.

As shown in FIG. 9, in one embodiment, the back lifting assembly 140 comprises a back lifting bracket 141 pivotally connected to the frame structure 12, and a back lifting actuator 142 pivotally connected between the back lifting bracket 141 and the frame structure 12 for operably driving the back lifting bracket 141 to pivotally move in an upward rotating direction or a downward rotating direction relative to the frame structure 10, thereby causing the back platform 101 and therefore the back portion of the user to be lifted up or lifted down.

The leg lifting assembly 150 comprises a leg lifting bracket 151 pivotally coupled to the frame structure 12, and a leg lifting actuator 152 pivotally connected between the leg lifting bracket 151 and the frame structure 12 for operably driving the leg lifting bracket 151 to pivotally move in an upward rotating direction or a downward rotating direction relative to the frame structure 12, thereby causing the thigh and leg platforms 104 and 105 and therefore the leg portion of the use to be lifted up or lifted down.

During the sleep, the signal acquisition and processing module 20 acquires the user sleep data from the user, processes the acquired user sleep data, and transmits the processed user sleep data to the control box 10. The control box 10 receives the processed user sleep data from the signal acquisition and processing module 20, generates operation instructions based on the obtained user sleep data, and sends the operation instructions to the controller 30. Responsively the controller 30 performs the corresponding operations based on the operation instructions received from the control box 10.

In some embodiment, the operation instructions may include an anti-snoring instruction, when snoring data/event is detected from the user sleep data and meets a preset condition. When the controller 30 receives an anti-snoring instruction from the control box 10, it instructs the back lifting assembly 140 and/or the leg lifting assembly 150 to adjust the positions and angles of platforms, so as to suppress or reduce snoring of the user. For example, when receiving the anti-snoring instruction, the controller 30 instructs the back lifting assembly 140 to activate the back lifting actuator 142 to adjust the position and angle of the back platform 101. When the user feels the movement of the back platform 101, it may be wake up, or change sleep positions, thereby stopping or suppressing snoring. The angle of the back platform 101 at which the back lifting assembly 140 controls the back lifting actuator 142 to adjust is preferably but not limited to about 5-10°.

In addition, the operation instructions may also include adjust the positions and angles of the back platforms 101 and the thigh and leg platforms 104 and 105 at the user's preference. Furthermore, the user may be able to set up and/or change these positions and angles through the user terminal 40.

In addition, the bed also includes a driving mechanism 160 having a plurality of actuators 161, 162, 163 and 164 for driving the back assembly 140 and the leg assembly 150 and/or the massagers 171 and 172, respectively, based on the operation instruction from the controller 30. For example, in some embodiments, the actuators 161 and 162 are corresponding to the back lifting actuator 142 and the leg lifting actuator 152, respectively.

Figure 7:
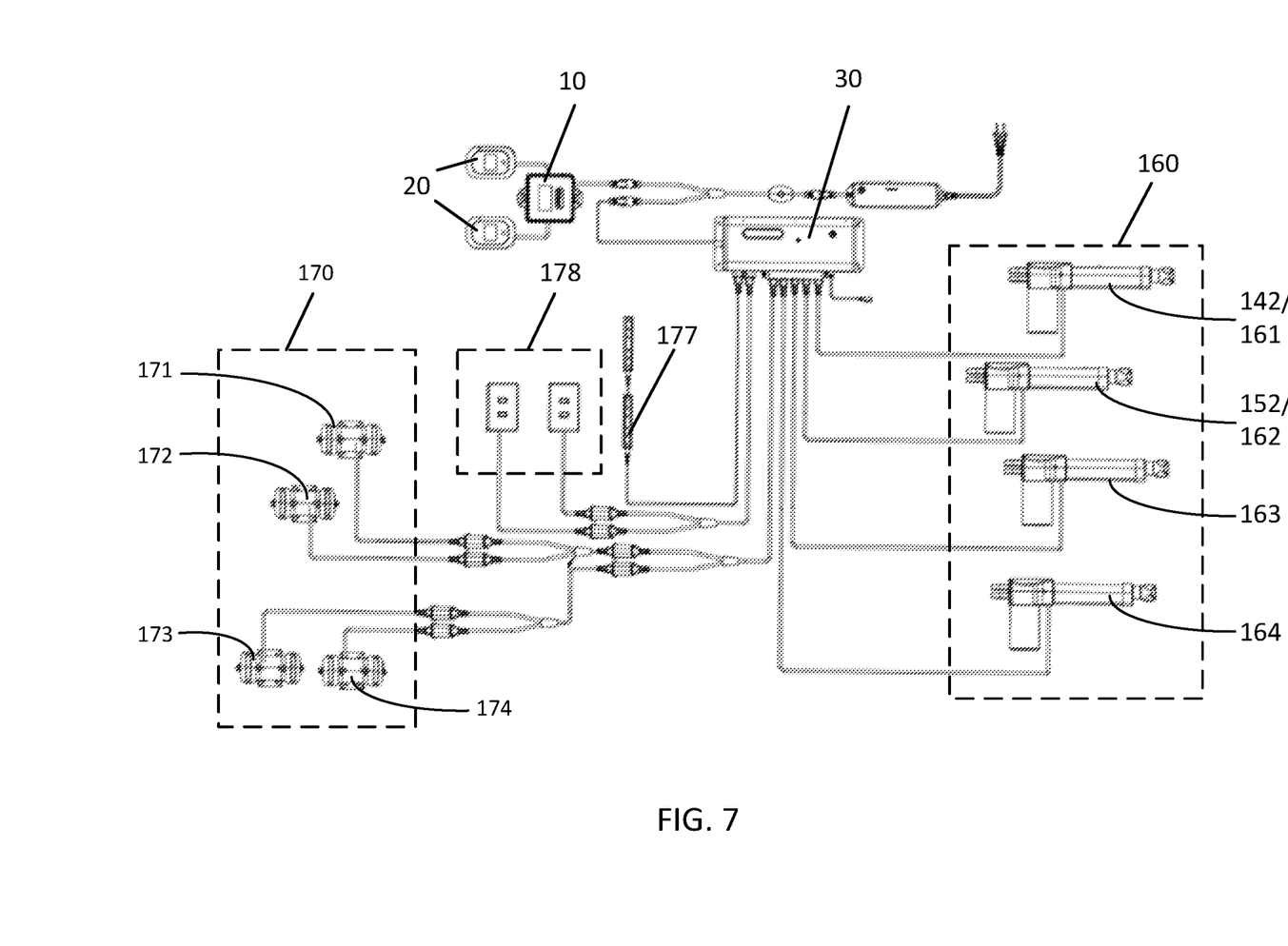
FIG. 7 is a schematic diagram of a control system of a smart bed according to one embodiment of the present invention.

In some embodiments shown in FIGS. 7-9, the bed further includes a massaging device 170 (FIG. 7) including a plurality of massagers 171, 172, 173 and 174 installed in the platforms for providing massage effect. For example, in one embodiment shown in FIGS. 8-9, the massager 171 is installed in the back platform 101 for operably providing the massage effect on the back portion of the user, and the massager 172 is installed in the leg platform 105 for operably providing the massage effect on the leg portion of the user. The massager 173 is installed the back platform 101 corresponding to the neck portion of the user for operably providing the massage effect on the neck portion. The massager 174 is installed the waist platform 102/103 corresponding to the waist portion of the user for operably providing the massage effect on the waist portion. Accordingly, the massaging device 170 is controlled, as needed, to achieve the corresponding leg massage, waist massage or cervical spine massage for the user.

In some embodiments, the bed further includes a light bar 177 for displaying the working state of the bed. In addition, the bed may also include charging sockets 108 for providing charging functions.

In sum, according to the invention, the sleep data of the user can be analyzed within the bed through the control panel with the operating system, and the communication between the electric bed and the user terminal can be directly realized, which effectively avoid the uploading of the monitored sleep data of the bed to the cloud server, thereby reducing the risk in the data leakage of the user. The analysis of the user sleep data according to the invention requires no subscription of a cloud server and thus the cost can be reduced. In addition, the smart bed of the invention can collect various user sleep data such as the user respiration, the user heart rate, the user motion, snoring, etc., and monitor the user sleep data based on the preset sleep analysis model, which can achieve multi-dimensional and high-precision sleep analysis data. Further, by adjusting the position and angle of the back platform of the bed when snoring is detected, the user's snoring can be effectively suppress and controlled. Moreover, the sensors are installed on the upper surface of the platforms and directly contacts the user body during the sleep, which makes the collected user body sleep data more accurate. Therefore, the invention effectively overcomes various shortcomings in the prior art and has high industrial relevance.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A control system of a bed having at least one platform, comprising:
    a signal acquisition and processing module; a control box coupled to the signal acquisition and processing module; and a controller coupled to the control box,
    wherein the signal acquisition and processing module is configured to acquire user sleep signals from a user of the bed, process the acquired user sleep signals to generate the user sleep data comprising user respiration data and user heart rate data, and transmit the user sleep data to the control box, wherein the signal acquisition and processing module comprises:
- at least one data acquisition member configured to acquire the user sleep signals, wherein the data acquisition member comprises at least one sensor and at least one microphone, wherein the at least one sensor comprises at least one piezoelectric sensor, at least one gyroscope sensor, and/or at least one inertial measurement unit (IMU); and
- at least one signal processing module coupled with the at least one data acquisition member and configured to process the acquired user sleep signals to generate the user sleep data, wherein the at least one signal processing module comprises a microprocessor configured to filter the user sleep signals received from the at least one data acquisition member into multiple signals including one ultra-low-pass signal of a respiratory wave and one low-pass signal of a heart rate wave through a built-in software filter, and calculate respectively the respiration wave as the user respiration rate data and the heart rate wave as the user heart rate data through a preset algorithm;

wherein the control box is configured to receive the processed user sleep data from the signal acquisition and processing module, generate operation instructions based on the received user sleep data, and send the operation instructions to the controller; and wherein the controller is configured to perform corresponding operations based on the operation instructions received from the control box; and wherein the control box comprises:
- a control panel with an operating system, coupled with the signal acquisition and processing module and the controller and configured to receive the processed user sleep data from the signal acquisition and processing module;
- a sleep data analysis module, configured to run in the control panel with the operating system and generate sleep analysis data based on the user sleep data received from the signal acquisition and processing module, and a pre-trained sleep analysis model; and
- a wireless communication module, configured to run in the control panel with the operating system and transmit the generated sleep analysis data to a user terminal through a wireless network, so that the user terminal can view all the sleep analysis data.

2. The control system of claim 1,
wherein the at least one signal processing module further comprises an amplifier configured to amplify the acquired user sleep signals; and an analog-to-digital conversion (ADC) circuit configured to perform analog-to-digital conversion of the acquired user sleep signals.

3. The control system of claim 1, wherein the at least one sensor further comprises at least one pressure sensor, and/or at least one temperature sensor.

4. The control system of claim 3, wherein the at least one sensor is operably installed on an upper surface of the at least one platform.

5. The control system of claim 1, wherein the control panel with the operating system comprises a system on a chip (SoC) having a processor coupled with the sleep data analysis module and the wireless communication module.

6. The control system of claim 5, wherein the sleep data analysis module comprises:
- a data accumulation unit, configured to accumulate the user sleep data of a preset duration and/or a preset amount of data; and
- a sleep analysis model unit, configured to generate the sleep analysis data by using the user sleep data of the preset duration and/or the preset data amount as an input of the sleep analysis model.

7. The control system of claim 6, wherein the sleep data analysis module further comprises:
- a control unit, configured to detect snoring data from the user sleep data, generate an anti-snoring instruction when the snoring data meets a preset condition, and send the anti-snoring instruction to the controller, wherein the controller responsively adjusts an angle of the at least one platform of the bed based on the anti-snoring instruction, so as to suppress snoring of the user.

8. The control system of claim 6, wherein the control box further comprises:
- an external storage module, being pluggably installable on the control panel and in communication with the sleep data analysis module, and configured to receive the sleep analysis data from the sleep data analysis module and store the sleep analysis data therein.

9. The control system of claim 1, wherein the user sleep data further comprises one or more of user motion data, and snoring data; wherein the sleep analysis data comprises one or more of deep sleep analysis data, light sleep analysis data, rapid eye movement sleep analysis data, and sleep-wake state analysis data.

10. The control system of claim 9, wherein the microprocessor is configured to determine an overload and large amplitude user sleep signal of the user sleep signals received from the at least one data acquisition member as the user body motion data.

11. A bed, comprising:
- a frame structure;
- at least one platform moveably attached to the frame structure; and
- a control system comprising a signal acquisition and processing module; a control box coupled to the signal acquisition and processing module; and a controller coupled to the control box, wherein the signal acquisition and processing module is configured to acquire user sleep signals from a user of the bed, process the acquired user sleep signals to generate the user sleep data comprising user respiration data and user heart rate data, and transmit the user sleep data to the control box, wherein the signal acquisition and processing module comprises:
- at least one data acquisition member configured to acquire the user sleep signals, wherein the data acquisition member comprises at least one sensor and at least one microphone, wherein the at least one sensor comprises at least one piezoelectric sensor, at least one gyroscope sensor, and/or at least one inertial measurement unit (IMU); and
- at least one signal processing module coupled with the at least one data acquisition member and configured to process the acquired user sleep signals to generate the user sleep data, wherein the at least one signal processing module comprises a microprocessor configured to filter the user sleep signals received from the at least one data acquisition member into multiple signals including one ultra-low-pass signal of a respiratory wave and one low-pass signal of a heart rate wave through a built-in software filter, and calculate respectively the respiration wave as the user respiration rate data and the heart rate wave as the user heart rate data through a preset algorithm;

wherein the control box is configured to receive the processed user sleep data from the signal acquisition and processing module, generate operation instructions based on the received user sleep data, and send the operation instructions to the controller; and wherein the controller is configured to perform corresponding operations based on the operation instructions received from the control box; and wherein the control box comprises:
- a control panel with an operating system, coupled with the signal acquisition and processing module and the controller and configured to receive the processed user sleep data from the signal acquisition and processing module;
- a sleep data analysis module, configured to run in the control panel with the operating system and generate sleep analysis data based on the user sleep data received from the signal acquisition and processing module, and a pre-trained sleep analysis model; and
- a wireless communication module, configured to run in the control panel with the operating system and transmit the generated sleep analysis data to a user terminal through a wireless network, so that the user terminal can view all the sleep analysis data.

12. The bed of claim 11, wherein the at least one signal processing module further comprises an amplifier configured to amplify the acquired user sleep signals; and an analog-to-digital conversion (ADC) circuit configured to perform analog-to-digital conversion of the acquired user sleep signals.

13. The control system of claim 11, wherein the at least one sensor further comprises at least one pressure sensor, and/or at least one temperature sensor.

14. The bed of claim 13, wherein the at least one platform has at least one groove formed on its upper surface, and the at least one sensor is operably installed on an upper surface of the at least one platform, such that when installed, the surface of the at least one sensor is in a co-plane with the upper surface of the at least one platform.

15. The bed of claim 11, wherein the control panel with the operating system comprises a system on a chip (SoC) having a processor coupled with the sleep data analysis module and the wireless communication module.

16. The bed of claim 15, wherein the sleep data analysis module comprises:
- a data accumulation unit, configured to accumulate the user sleep data of a preset duration and/or a preset amount of data; and
- a sleep analysis model unit, configured to generate the sleep analysis data by using the user sleep data of the preset duration and/or the preset data amount as an input of the sleep analysis model.

17. The bed of claim 16, wherein the sleep data analysis module further comprises:
- a control unit, configured to detect snoring data from the user sleep data, generate an anti-snoring instruction when the snoring data meets a preset condition, and send the anti-snoring instruction to the controller, wherein the controller responsively adjusts an angle of the at least one platform of the bed based on the anti-snoring instruction, so as to suppress snoring of the user.

18. The bed of claim 11, further comprising a back lifting assembly and a leg lifting assembly moveably connected to the frame structure and electrically coupled with the controller, wherein a back portion and a leg portion of the user are operably in relation to the back lifting assembly and the leg lifting assembly, respectively, and positions of the back portion and the leg portion of the user are individually and/or coordinately adjustable in accordance with operations of the back lifting assembly and the leg lifting assembly.

19. The bed of claim 18,
wherein the back lifting assembly comprises a back lifting bracket pivotally connected to the frame structure, and a back lifting actuator pivotally connected between the back lifting bracket and the frame structure for operably driving the back lifting bracket to pivotally move in an upward rotating direction or a downward rotating direction relative to the frame structure, thereby causing a back portion of the at least one platform and therefore the back portion of the user to be lifted up or lifted down; and
wherein the leg lifting assembly comprises a leg lifting bracket pivotally coupled to the frame structure, and a leg lifting actuator pivotally connected between the leg lifting bracket and the frame structure for operably driving the leg lifting bracket to pivotally move in an upward rotating direction or a downward rotating direction relative to the frame structure, thereby causing a leg portion of the at least one platform and therefore the leg portion of the user to be lifted up or lifted down.

20. The bed of claim 11 wherein further comprising at least one massager installed in the at least one platform and electrically coupled with the controller for providing massage effect to corresponding portions of the user.

* * * * *